(12) United States Patent
Munoz Fernandez et al.

(10) Patent No.: US 10,422,943 B2
(45) Date of Patent: Sep. 24, 2019

(54) LUMINAIRE WITH LIGHT GUIDE

(71) Applicant: SIGNIFY HOLDING B.V., Eindhoven (NL)

(72) Inventors: Fernando Munoz Fernandez, Eindhoven (NL); Jean-Francois Laporte, Laval (CA); Thomas Deflandre, Eindhoven (NL); Arno Vredenborg, Eindhoven (NL); Herman Vos, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/903,892

(22) Filed: Feb. 23, 2018

(65) Prior Publication Data

US 2018/0306967 A1 Oct. 25, 2018

(30) Foreign Application Priority Data

Mar. 2, 2017 (EP) ..................... 17158805

(51) Int. Cl.
*F21K 99/00* (2016.01)
*F21V 8/00* (2006.01)
(Continued)

(52) U.S. Cl.
CPC .............. *G02B 6/0068* (2013.01); *F21S 8/04* (2013.01); *F21S 8/085* (2013.01); *F21S 8/086* (2013.01); *F21V 7/0083* (2013.01); *G02B 6/002* (2013.01); *G02B 6/0031* (2013.01); *G02B 6/0033* (2013.01); *G02B 6/0053* (2013.01); *G02B 6/0055* (2013.01); *G02B 6/0065* (2013.01); *F21W 2131/103* (2013.01); *F21Y 2103/30* (2016.08); *F21Y 2105/00* (2013.01); *F21Y 2115/10* (2016.08)

(58) Field of Classification Search
CPC .............................. G02B 6/0068; G02B 6/002
USPC ....... 362/606, 610, 611, 612, 613, 615, 616, 362/628, 602, 604
See application file for complete search history.

(56) References Cited

U.S. PATENT DOCUMENTS 7,513,669 B2   4/2009  Chua et al.
8,061,884 B2  11/2011  Harbers et al.
(Continued)

FOREIGN PATENT DOCUMENTS

EP    2447747 A    5/2012
JP    2014154349 A  8/2014

*Primary Examiner* — Laura K Tso (57) ABSTRACT

A luminaire comprises a light guide having light outcoupling elements at one side and a flat light output surface at the other side, which is visible in use of the luminaire. An array of solid state lighting elements is arranged around the edge of the light guide facing the general light output direction. A respective reflector is associated with each solid state lighting element for reflecting light into the light guide. By providing the lighting elements all facing the general light output direction, they can be formed as a single unit, or as a small number of sub-units, thereby simplifying the manufacture. The design of the reflectors, the positioning of the lighting elements, and the design of the light outcoupling elements together may be used to create an asymmetrical light output beam shape. Actuation of different lighting elements may be used to provide different asymmetric light outputs.

16 Claims, 8 Drawing Sheets

(51) Int. Cl.
   *F21S 8/04*     (2006.01)
   *F21S 8/08*     (2006.01)
   *F21V 7/00*     (2006.01)
   *F21W 131/103*      (2006.01)
   *F21Y 105/00*       (2016.01)
   *F21Y 115/10*       (2016.01)
   *F21Y 103/30*       (2016.01)

(56) References Cited

U.S. PATENT DOCUMENTS

| | | | | |
|---|---|---|---|---|
| 8,197,112 B2 * | 6/2012 | Park | ............... | G02F 1/133621 |
| | | | | 362/249.03 |
| 8,616,736 B2 * | 12/2013 | Pan | ............... | G02B 5/045 |
| | | | | 362/345 |
| 8,876,309 B2 * | 11/2014 | Chang | ............... | G02B 6/0011 |
| | | | | 362/23.03 |
| 8,876,351 B2 * | 11/2014 | Wei | ............... | F21S 8/03 |
| | | | | 362/235 |
| 8,931,945 B2 * | 1/2015 | Yamagami | ............... | F21S 8/06 |
| | | | | 362/602 |
| 2005/0185113 A1 | 8/2005 | Weindorf et al. | | |
| 2006/0290844 A1 | 12/2006 | Epstein et al. | | |
| 2009/0046477 A1 * | 2/2009 | Salters | ............... | G02B 6/0076 |
| | | | | 362/602 |
| 2010/0213877 A1 * | 8/2010 | Galeazzi | ............... | H04N 9/73 |
| | | | | 315/312 |
| 2011/0038175 A1 * | 2/2011 | Park | ............... | G02B 6/0068 |
| | | | | 362/609 |
| 2012/0106198 A1 * | 5/2012 | Lin | ............... | G02B 6/0083 |
| | | | | 362/609 |
| 2012/0140436 A1 | 6/2012 | Yang et al. | | |
| 2014/0009967 A1 * | 1/2014 | Akahori | ............... | G02B 6/0011 |
| | | | | 362/623 |
| 2014/0092628 A1 * | 4/2014 | Ye | ............... | G02B 6/0045 |
| | | | | 362/606 |
| 2016/0103268 A1 * | 4/2016 | Sui | ............... | F21V 7/0008 |
| | | | | 362/611 |
| 2016/0370535 A1 | 12/2016 | Boomgaarden et al. | | |

* cited by examiner

LUMINAIRE WITH LIGHT GUIDE

FIELD OF THE INVENTION

The present invention relates to a luminaire which makes use of a light guide and a plurality of solid state lighting elements arranged to couple light into an edge portion of the light guide.

BACKGROUND OF THE INVENTION

Solid state lighting (SSL), e.g. LED lighting, is rapidly gaining popularity because of its energy credentials and superior lifetime compared to traditional lighting, e.g. incandescent lighting, fluorescent lighting and halogen lighting. Nevertheless, market penetration of such SSL devices is not without challenges. For example, purchase cost of SSL devices is still higher than that of equivalent traditional light sources, even though the effective cost of such SSL devices is markedly lower due to their much longer lifetime.

Another serious challenge is to provide a luminaire including SSL elements that offers the same visual experience as such traditional light sources. This is a far from trivial challenge, given that such luminaires typically comprise a plurality of SSL elements that act as point sources, which may lead to pixilation and glare in the luminous output of the SSL-based luminaire.

For this reason, some luminaire may include additional optical elements, e.g. diffusers, to diffuse the luminous output of the luminaire, thereby reducing pixilation and glare effects. One particular class of such diffusers are light guides, which are optical bodies comprising opposing total internal reflection surfaces, where light from an SSL element such as a LED is typically coupled into the light guide through an edge surface extending between the opposing total internal reflection surfaces. Light is coupled out of the light guide using outcoupling structures, e.g. on one of the surfaces, which disrupt the total internal reflection and allow for light to escape the light guide. Therefore, by arranging the outcoupling structures in a particular pattern, the luminous output distribution of the light guide may be controlled to a certain degree. An example of a light guide is disclosed in U.S. Pat. No. 8,033,706 B1.

In certain application domains, e.g. outdoor lighting, it may be aesthetically desirable to produce an asymmetric beam having good diffusiveness characteristics, i.e. having a uniformly lit light exit surface. It is not trivial to meet these requirements with light guides.

In some cases, a light output is desired which does not show pixilation, but which is also asymmetrical.

One solution proposed by the applicant is to provide a light guide for mounting horizontally and having an arrangement of light sources around at least part of the edge. By selecting which light sources are turned on, an asymmetric light output may be created. This enables an asymmetric beam to be formed having good uniformity, i.e. a beam formed with substantially the entire light exit surface, and with directional control.

However, this design requires the light sources to be mounted against the edge, requiring a flexible carrier circuit board or else individual mounting of the light sources.

SUMMARY OF THE INVENTION

The present invention seeks to provide a luminaire with a light guide that can produce an asymmetric beam having good uniformity, and which can be manufactured simply and with low cost.

Examples in accordance with the invention provide a luminaire comprising:

a light guide comprising an edge portion between a first major surface and a second major surface, wherein the first major surface defines light outcoupling elements and the second major surface is a flat light output surface which is visible in use of the luminaire, wherein a general light output direction is normal to the second major surface;

an output reflector facing the first major surface;

an array of solid state lighting elements arranged around the edge portion and each having an optical axis extending along, and facing the general light output direction; and an array of lighting element reflectors, with a respective reflector associated with each solid state lighting element for reflecting light into the light guide.

By providing the lighting elements all facing the general light output direction, they can be formed as a single unit, or as a small number of sub-units, thereby simplifying the manufacture. The lighting element reflectors essentially redirect the light to a lateral direction (i.e. perpendicular to the general light output direction) for entering the light guide. There is a reflector for each lighting element. However, they also perform transformation of the output beam shape from the lighting elements (e.g. a Lambertian distribution) into a desired beam shape that provides the desired output from the light guide. They may function as collimators.

The expression "an array of solid state lighting elements . . . each having an optical axis extending along . . . the general light output direction" is to be understood as that the optical axis of each individual solid state element is more or less, i.e. within a cone of 10 degrees with the general light output direction, or is exactly parallel to said light output direction.

The lighting elements are for example mounted in a horizontal plane, parallel to the plane of the light guide. This improves thermal management.

The design of the lighting element reflectors, the positioning of the lighting elements, and the design of the light outcoupling elements together may create an asymmetrical light output beam shape. Furthermore, actuation of different lighting elements may be used to provide different asymmetric light outputs.

The flat second major surface provides a clean aesthetic look for the light output face of the luminaire, with the light outcoupling elements on the opposite surface ensuring a uniform light intensity across the visible second major surface. The second major surface may be the final output face of the luminaire, or there may be a further transparent protective plate.

The array of solid state lighting elements may be provided on a flat printed circuit board having an annular or part-annular shape. The shape matches the outer shape of the light guide. It means the lighting elements may be provided in conventional manner on a printed circuit board. The printed circuit board may be single-piece or a multi-piece board, but there are multiple lighting elements on each board piece.

The flat printed circuit board for example has a C-shape, and wherein the solid state lighting elements are placed closer together away from the ends than at the ends.

The edge portion of the light guide may have a stepped shape, with each solid state lighting element positioned at a step portion. The step portion means the interface between the light guide and the lighting element can be perpendicular to the desired general direction of illumination from the lighting element reflector into the light guide. This direction may thus not necessarily be towards the center of the shape of the light guide. By having different lighting elements having their output reflected towards different directions (not all pointing in parallel or all pointing to a central point of the light guide) a complex desired light output distribution may be obtained. The stepped shape allows better uniformity of the light output.

The light guide and the array of lighting element reflectors may be formed as an integral unit. This reduces the number of components.

The outer shape of the light guide is for example generally (i.e. excluding the steps if provided) circular or elliptical.

The light outcoupling elements may comprise 3-D optical elements or printed white dots. In one example the light outcoupling elements comprise prismatic elements. These interrupt total internal reflection in the light guide, so that light then escapes from the first major surface, or the second major surface or both.

The light guide, excluding the light outcoupling elements, preferably has uniform thickness. This provides a simple to manufacture option.

There is for example an array of more than 500 light outcoupling elements.

The high density of small light outcoupling elements gives a uniform light output distribution.

The lighting element reflectors may comprise reflective Cartesian ovals. These match a spherical output from the solid state light elements to a desired wave front for entering the light guide.

There is for example an array of more than 20 solid state lighting elements.

The luminaire preferably comprises a controller arranged to individually control the solid state lighting elements. This enables different output beams to be defined by a common physical design of luminaire.

The light guide may comprise a polymer material selected from polycarbonate, poly(methyl methacrylate) and polyethylene terephthalate.

By way of example the luminaire may be an outdoor luminaire, such as a street lamp. The invention may also be applied to indoor lighting.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

The invention provides a luminaire which comprises a light guide having light outcoupling elements at one side and a flat light output surface at the other side, which is visible in use of the luminaire. An array of solid state lighting elements is arranged around the edge of the light guide facing the general light output direction. A respective reflector is associated with each solid state lighting element for reflecting light into the light guide.

By providing the lighting elements all facing the general light output direction, they can be formed as a single unit, or as a small number of sub-units, thereby simplifying the manufacture. The design of the reflectors, the positioning of the lighting elements, and the design of the light outcoupling elements together may be used to create an asymmetrical light output beam shape. Actuation of different lighting elements may be used to provide different asymmetric light outputs.

A luminaire design which has been proposed by the applicant will first be discussed.

Figure 1:
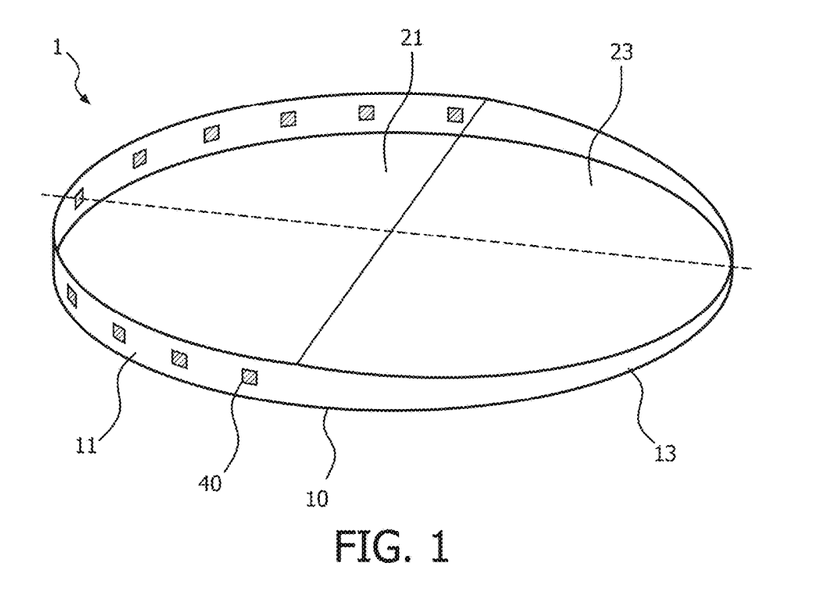
FIG. 1 shows a perspective view of a luminaire as proposed by the applicant.
Figure 2:
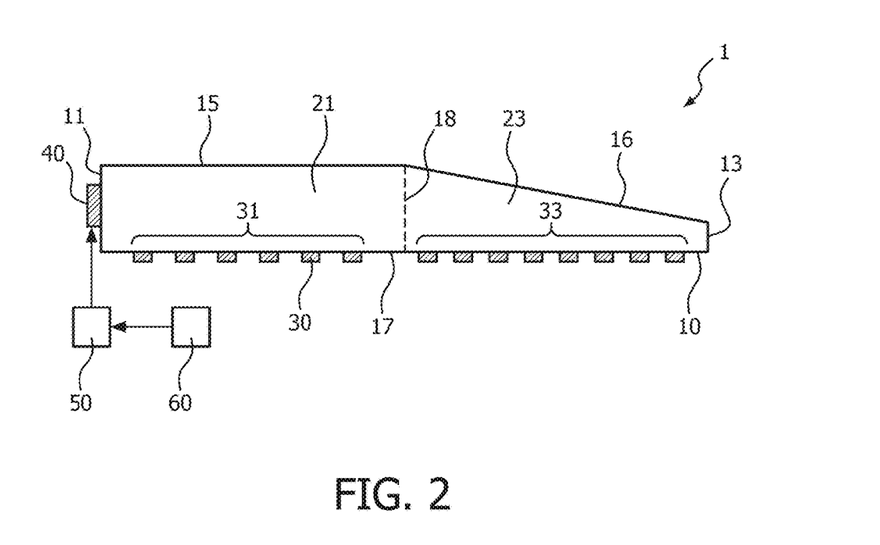
FIG. 2 shows a cross-sectional view of a luminaire according to FIG. 1.

FIG. 1 schematically depicts a perspective view of a luminaire 1 and FIG. 2 schematically depicts a cross-section of the luminaire 1 along the dashed line in FIG. 1. The luminaire 1 comprises an ellipsoid light guide 10, for example a circular light guide. A circular light guide may be considered a special case of an ellipsoid light guide, as it is well-known from mathematics that a circle is a special case of an ellipse. The ellipsoid light guide 10 comprises a first major surface 15 opposite a second major surface 17, which act as total internal reflection (TIR) surfaces of the ellipsoid light guide 10. As will be known per se, light incident at such TIR surfaces under an angle below the critical angle of the TIR surface is internally reflected, which 'traps' light between the first major surface 15 and the second major surface 17, such that the light within the light guide 10 is guided between these surfaces.

Outcoupling elements 30 may be provided on at least one of the major surfaces 15, 17 (here provided on the second major surface 17). The outcoupling elements 30 may be arranged in a defined pattern in order to control the locations at which light is coupled out of the light guide 10, e.g. to control the uniformity of the luminous output of the light guide 10. For example, a lower density of such outcoupling elements 30 may be provided proximal to a light source, e.g. a SSL element 40 compared to more distal regions of the light guide 10, in order to avoid an excessive amount of light being coupled out of the light guide 10 proximal to such a light source. The outcoupling elements 30 may be provided in any suitable manner. For example, the outcoupling elements 30 may be formed by roughening, e.g. texturing, the second major surface 17, for example by sandblasting, char milling, etcetera. Alternatively, the outcoupling elements 30 may be formed by positioning dedicated optical elements, e.g. 3-D elements such as lenslets, spheres, cones, prisms or the like, on the second major surface 17. The outcoupling elements 30 alternatively may be formed as white dots, e.g. through ink screen printing, inkjet printing or the like. Many other suitable embodiments of such outcoupling elements 30 will be immediately apparent to the skilled person.

In the example shown in FIG. 1 and FIG. 2, the ellipsoid light guide 10 comprises a first radial segment 21 and a second radial segment 23, which segments combine to form the light guide 10. The first radial segment 21 and the second radial segment 23 are semi-circular radial segments although other shape radial segments may be contemplated. The first radial segment 21 is delimited by an outer edge 11 of constant height extending between the first major surface 15 and the second major surface 17, i.e. the first radial segment 21 may be a segment of constant thickness. The second radial segment 23 may include a tapered surface portion 16 of the first major surface 15, which tapered surface portion 16 tapers from the boundary 18 between the first radial segment 21 and the second radial segment 23. In other words, the second radial segment 23 decreases in thickness at increasing distance from the boundary 18. The second radial segment 23 may be linearly tapered, such that the second radial segment 23 is delimited by a further edge 13 of the circular light guide 10 extending between the first major surface 15 and the second major surface 17, which further edge 13 decreases in height at increasing distance from the boundary 18 along the circumference of the circular light guide 10.

Along the edge 11, a plurality of SSL elements 40, e.g. LEDs are arranged such that the luminous output of the SSL elements 40 is coupled into the first radial segment 21 of the circular light guide 10 upon the SSL elements 40 being engaged by the controller 50. The controller 50 preferably is adapted to individually control the respective SSL elements 40, such that the controller 50 may select which SSL elements 40 along the edge 11 are to be deployed in order to generate a particular beam profile with the luminaire 1. The SSL elements 40 may be identical SSL elements or may contain different SSL elements, e.g. the SSL elements 40 may include different SSL elements arranged to produce respective luminous outputs having different spectral compositions, e.g. light of different colors. For example, the SSL elements 40 may include red LEDs, green LEDs and blue LEDs. Alternatively, the SSL elements 40 may include cool white LEDs, warm white LEDs and/or daylight LEDs. In such embodiments, the controller 50 may control the beam shape and/or the spectral composition of the luminous output produced with the luminaire 1. Any suitable type of SSL elements 40 may be used for this purpose. The SSL elements 40 may directly optically coupled into the light guide 10 through the edge 11 or alternatively may be coupled into the light guide 10 through the edge 11 using an optical element such as a collimator or the like, for example to ensure that substantially all light emitted by the SSL elements 40 is coupled into the light guide 10.

In an example, the luminaire 1 further comprises a wireless communication module 60 coupled to the controller 50 for remotely controlling the controller 50. The wireless controller 60 may be adapted to communicate with a remote device, e.g. a dedicated remote controller, remote control functionality programmed onto a smart device such as a mobile phone, tablet computer or the like, and so on, using any suitable wireless communication protocol, e.g. Wi-Fi, Bluetooth, Zigbee, NFC, a mobile communication protocol, and so on, which communication may be secured in some embodiments using any suitable encryption technique. In this manner, the luminaire 1 may be remotely configured by controlling the controller 50 through the wireless communication module 60, e.g. to configure the beam shape to be produced by the luminaire 1 by instructing the controller 50 to select the appropriate SSL elements 40 for producing this beam shape, such that the beam shape matches the required illumination function to be provided by the luminaire 1. This for instance is particularly advantageous in outdoor lighting applications, e.g. street lamps, in which the luminous profile to be produced by the street lamp may be configured to match the mounting position and/or the street dimensions, e.g. width of the street. However, such remote configurability of the luminaire 1 may be equally useful in other application domains, e.g. indoor lighting, for example to create certain aesthetic effects with the luminaire 1.

The SSL elements 40 may be mounted along the edge 11 in any suitable manner. For example, the SSL elements 40 may be mounted on an inner surface of a housing (not shown) of the luminaire 1 facing the edge 11, may be mounted on a carrier (not shown) attached to the housing or the light guide 10, may be directly attached to the light guide 10, and so on. Many other suitable arrangements will be immediately apparent to the skilled person.

The first radial segment 21 preferably has a constant thickness such that a substantial portion of the light from the SSL elements 40 coupled into the light guide 10 may travel through the first radial segment 21 through total internal reflection towards the second radial segment 23, where emission of this light from the light guide 10 is promoted by the tapered (slanted) surface portion 16 of the first major surface 15. This is at least partially because the slanted surface portion 16 reflects incident light towards the opposing second major surface 17 under an increased angle (compared to two opposing parallel surfaces) such that there is an increased likelihood of such reflected light rays falling onto the second major surface 17 under an angle exceeding the critical angle at which total internal reflection takes place, thereby promoting escape of these light rays from the light guide 10 through the second major surface 17, i.e. the light exit surface of the light guide 10.

In order to achieve a substantially uniform luminous output from the light exit surface of the ellipsoid light guide 10, e.g. a circular light guide, the pattern of outcoupling elements 30 may be divided into a first pattern 31 of outcoupling elements 30 on the portion of the second major surface 17 of the first radial segment 21 and a second pattern 33 of outcoupling elements 30 on the portion of the second major surface 17 of the second radial segment 23, with the first pattern being different to the second pattern. More specifically, the second pattern 33 may have a higher pattern density than the first pattern 31 such that the likelihood of light exiting the second radial segment 23 is higher than the likelihood of light exiting the first radial segment 21. In this manner, the fact that there is a higher flux of light in the first radial segment 21 by virtue of this segment being proximal to the SSL elements 40 may be compensated with the difference in the patterns 31, 33 of outcoupling elements 30, e.g. to ensure a relatively even distribution of light emission across the second major surface 17 or at least to ensure that substantially the entire major surface 17 emits light, albeit with different intensities in different regions.

Figure 3A:
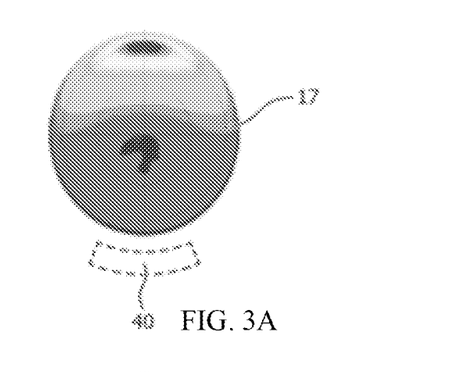
FIG. 3A-3C show luminous output profiles achieved with the luminaire in different configurations.
Figure 3B:
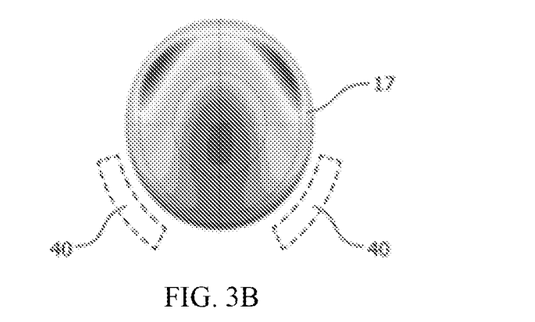
Figure 3C:
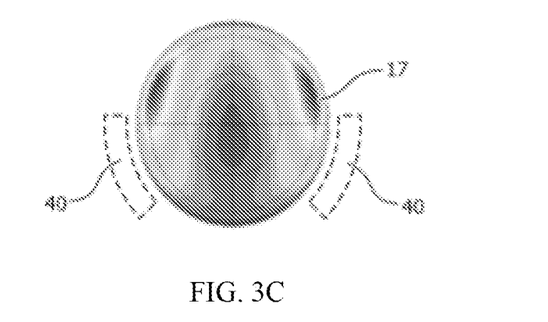

FIGS. 3A-3C schematically depicts three different luminous output profiles (beam profiles) emitted from the second major surface 17 of the luminaire 1, in which different groups of SSL elements 40 were enabled with the controller 50. This clearly demonstrates that different (asymmetric)

beam profiles may be generated by enabling different SSL elements along the edge 11 of the ellipsoid light guide 10, whilst retaining a uniform luminous output across the second major surface 17.

Depending on how the light is coupled into the light geode and depending on how the extraction features are designed or distributed, the performance of the luminaire will vary on terms of beam and uniformity of the luminance on the exit window.

In the example above, the LEDs are placed parallel to the edge of the light guide and this requires the printed circuit board to be placed vertically, so that the LEDs are parallel and facing the edge of the light guide. This configuration limits the thermal performance and allows only the use of mid-power LEDs. One option is to use flexible PCBs that can be deformed to the typical circular profile, and an alternative is to separate a flat rigid PCB into several parts in order to follow the rounded profile. The ability to steer the light output is also limited.

Figure 4:
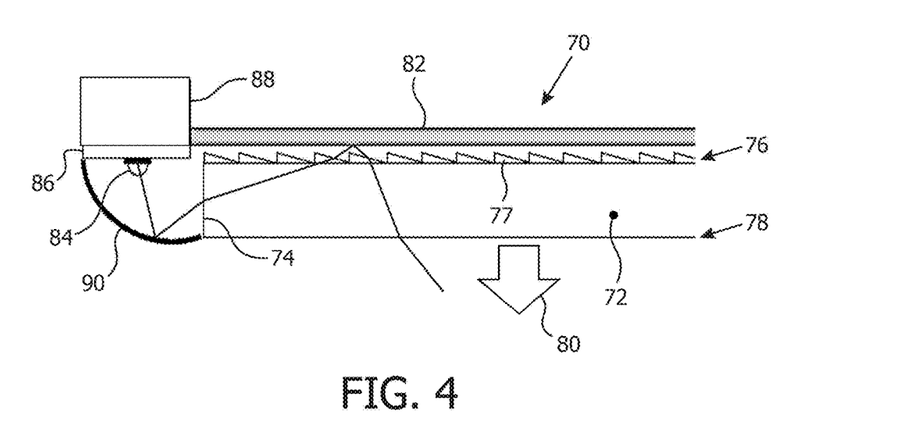
FIG. 4 shows an example of a luminaire in accordance with the invention.

FIG. 4 shows luminaire 70 comprising a light guide 72 which comprises an edge portion 74 between a first major surface 76 and a second major surface 78. The first major surface 76 defines light outcoupling elements 77 and the second major surface is a flat light output surface which is visible in use of the luminaire. A general light output direction 80 is normal to, and directed away from, the second major surface 78.

An output reflector 82 faces the first major surface 76, so that light which escapes from the first major surface is reflected back to the second major surface 78. The reflector 82 is highly reflective and very specular.

The flat second major surface provides a clean aesthetic look for the light output face of the luminaire. The second major surface may be the final output face of the luminaire, or there may be a further transparent protective plate.

The light guide 72 may have any general outer shape (i.e. when viewed from above or below in FIG. 4), for example circular, elliptical or rectangular. Around part or all of the outer edge there is an array of solid state lighting elements, for example LEDs, only one of which 84 is shown in FIG. 4 attached to a printed circuit board 86. There is a heat sink 88 on the opposite side of the circuit board 86 to the LED 84. The light emitting diodes 84 have a light output direction which corresponds with (i.e. is parallel with) the general light output direction 80.

In a typical application of the luminaire, the direction 80 is vertically downwards, so the light guide and printed circuit board are horizontal.

In order to redirect the light output from the LEDs into the light guide, each LED has a lighting element reflector 90.

Because the lighting elements all face the same direction, they can be formed on a common flat printed circuit board.

Figure 5:
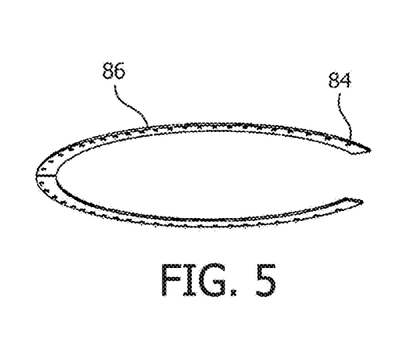
FIG. 5 shows the printed circuit board used in the luminaire of FIG. 4 in perspective view.
Figure 6:
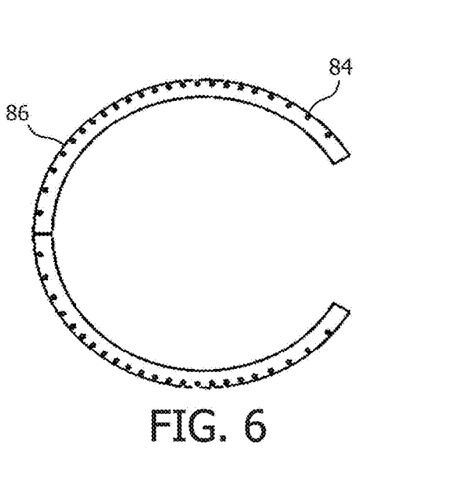
FIG. 6 shows the printed circuit board used in the luminaire of FIG. 4 in plan view.

FIG. 5 shows the printed circuit board 86 in perspective view and FIG. 6 shows the printed circuit board in plan view. In this example, it is formed as two co-planar sections i.e. sub-units.

The printed circuit board is part-annular so that it partially surrounds the light guide. It thus has a C-shape (i.e. an arc shape), and in the example shown there are two C-shaped sub-units. The LEDs are placed closer together near the middle of each C-shaped sub-unit than at the ends. This also means that for the overall circuit board, the LEDs at the ends have the larger spacing. There are for example between 20 and 200 LEDs The regions where the density of LEDs is higher provide a greater light intensity into the light guide and hence a greater light intensity out of the light guide in a related light output direction. In this way, an asymmetric light output is created.

It is alternatively possible to provide a uniform dense array of LEDs and to drive the LEDs into a pattern to create regions of greater light intensity and regions of lesser light intensity.

The arrangement of the LEDs on the PCB is generally determined by the shape of the light guide and by the desired light output distribution of the application.

Figure 7:
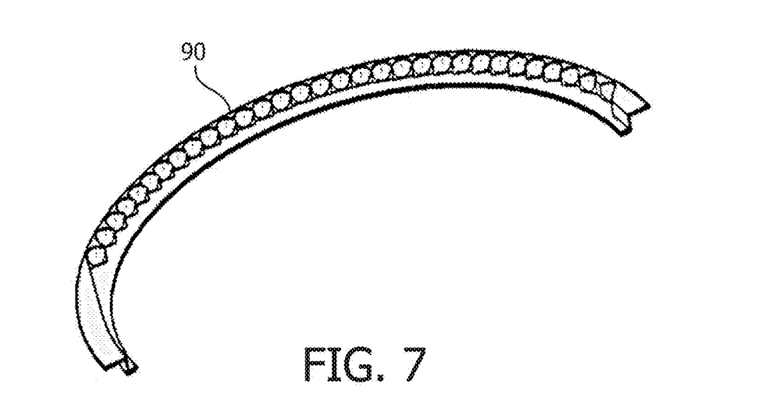
FIG. 7 shows an arrangement of lighting element reflectors used in the luminaire of FIG. 4.

FIG. 7 shows an arrangement of lighting element reflectors 90 corresponding to one of the PCB sub-units.

The reflectors 90 perform transformation of the output beam shape from the lighting elements (e.g. a Lambertian distribution) into a desired beam shape that provides the desired output from the light guide. They function as collimators.

The reflectors 90 are for example Reflective Cartesian Ovals (RCOs) and comprise a single, free-form mirrored surface. They are used to match a spherical wave front from the center of the LED into another desired wave front.

Figure 8:
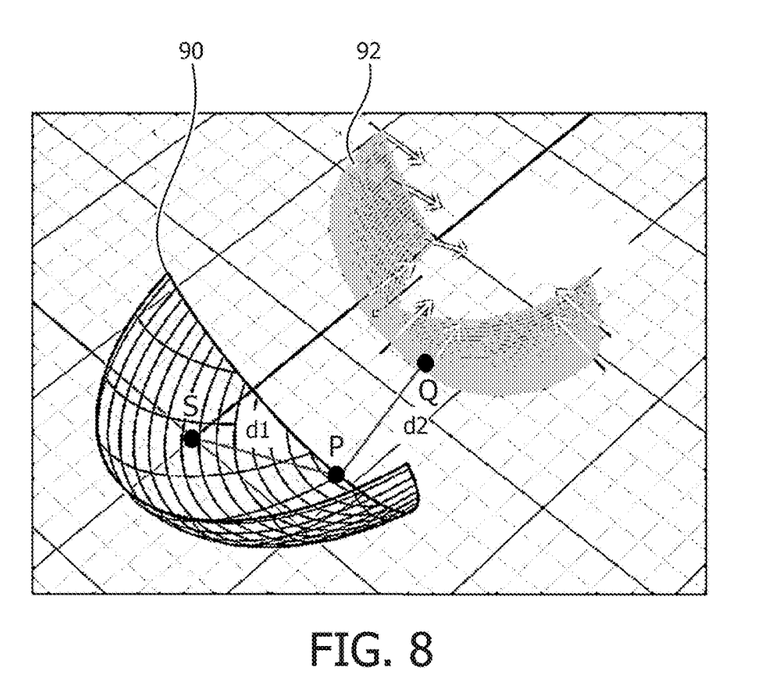
FIG. 8 shows a transformation process of one design of lighting element reflector.

This transformation process is shown in FIG. 8. The reflector 90 maintains constant the optical path length between the source S and a corresponding point Q on the desired wave front 92. Thus, for each point P on the surface of the reflector 90, the distance sum d1+d2 is a constant. The reflectors are placed individually at each LED.

Figure 9A:
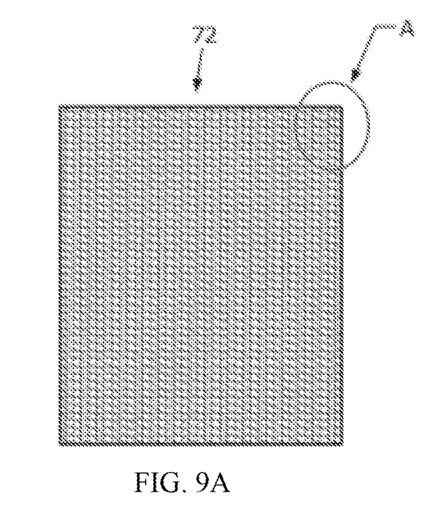
FIGS. 9A-9D show the light guide used in the luminaire of FIG. 4 in more detail.
Figure 9B:
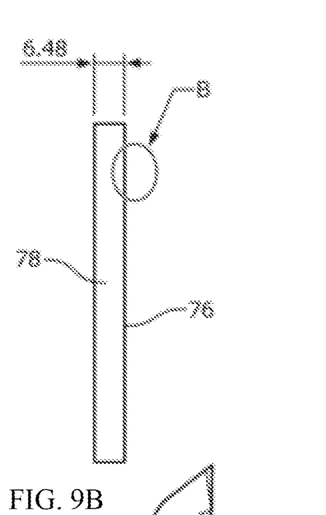
Figure 9C:
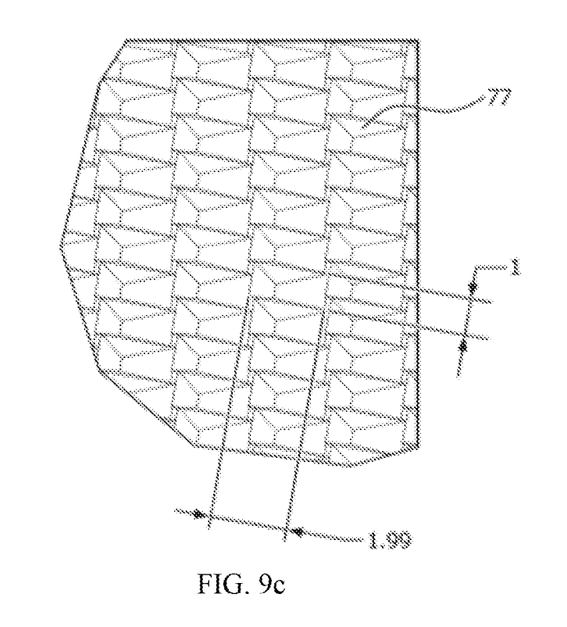
Figure 9D:
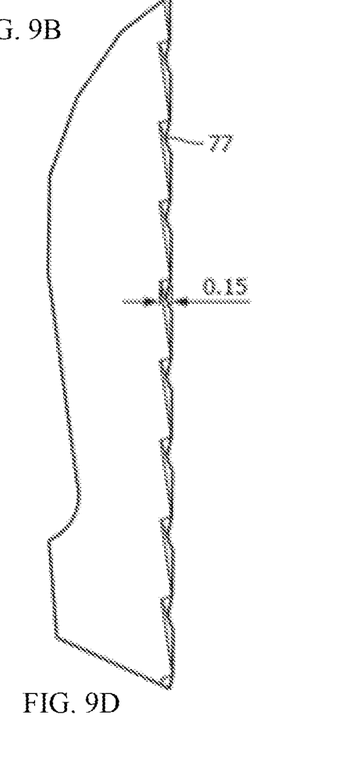

FIGS. 9A-9D are used to show the light guide in more detail and in particular the light outcoupling elements 77. FIG. 9A shows the light guide 72. FIG. 9B shows one example of the possible scale of the design. In the example, the light guide 72 is 6.48 mm thick, and as shown in FIG. 9C, the light outcoupling elements 77 have a pitch of 1 mm in one direction and 1.99 mm in an orthogonal direction. FIG. 9D show another view of the outcoupling elements 77. There are for example 500 to 10,000 light outcoupling elements 77 with a pitch of between 0.2 mm and 5 mm. The overall light guide for example has linear dimensions in the range 10 cm to 50 cm.

The light guide is a flat, planar, thin and constant-thickness plate that carries the light extraction features that disrupt the total internal reflection condition inside the light guide and allow the light to escape upwards or downwards. In the example shown, the structures are formed as truncated pyramids defined. They are designed to create good uniformity of the exit luminance.

The design of the lighting element reflectors, the positioning of the lighting elements, and the design of the light outcoupling elements together create desired light output beam shape, which may be symmetrical or asymmetrical.

Furthermore, actuation of different lighting elements may be used to provide different asymmetric light outputs.

The edge portion of the light guide may have a stepped shape, with each solid state lighting element positioned at a step portion. In one example, the faces of the steps are parallel to the general light output direction, i.e. they are vertical when the luminaire is mounted horizontally.

Figure 10:
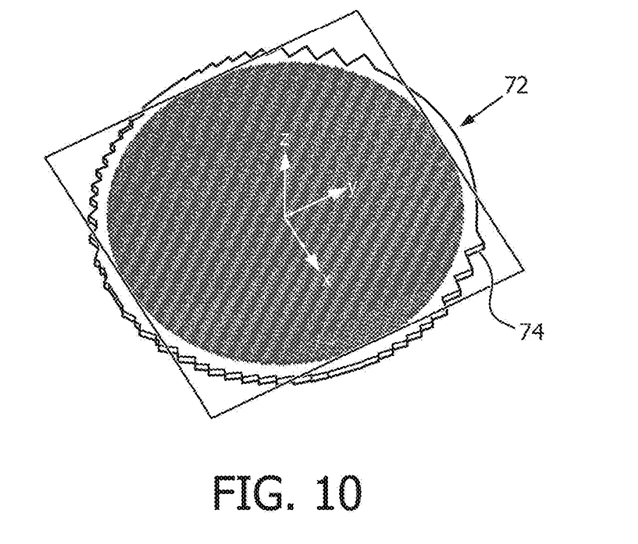
FIG. 10 shows an example of the light guide with stepped outer edge.

FIG. 10 shows an example of the light guide 72 with a stepped outer edge 74 with vertical steps.

Figure 11:
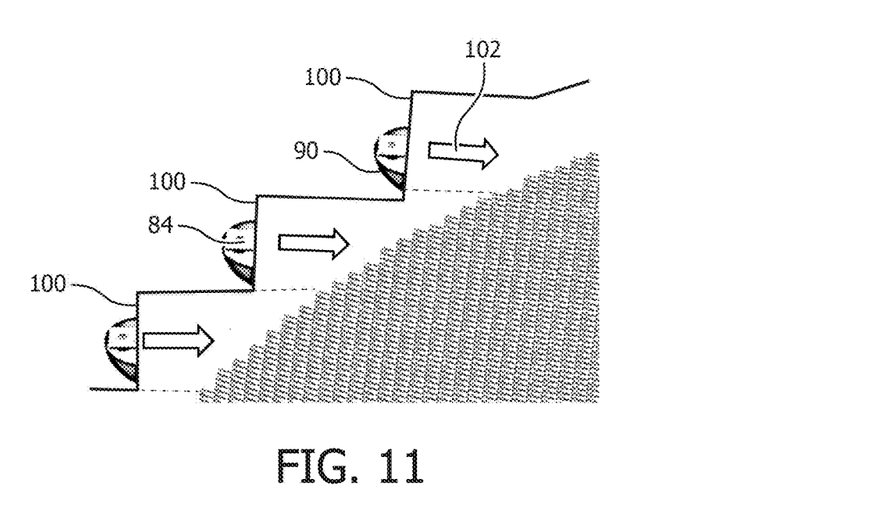
FIG. 11 shows the steps of the light guide of FIG. 10 in more detail.

As shown in FIG. 11, each step has a step portion 100 against which an LED is provided (FIG. 11 shows the LEDs but not the PCB to which they are attached).

The step portion 100 means the interface between the light guide and the LED is perpendicular to the desired general direction of illumination from the lighting element reflector into the light guide, shown by arrow 102. This direction may thus not necessarily be towards the center of the shape of the light guide since the steps can be oriented with any desired angle. A complex desired light output distribution may thus be obtained.

Figure 12:
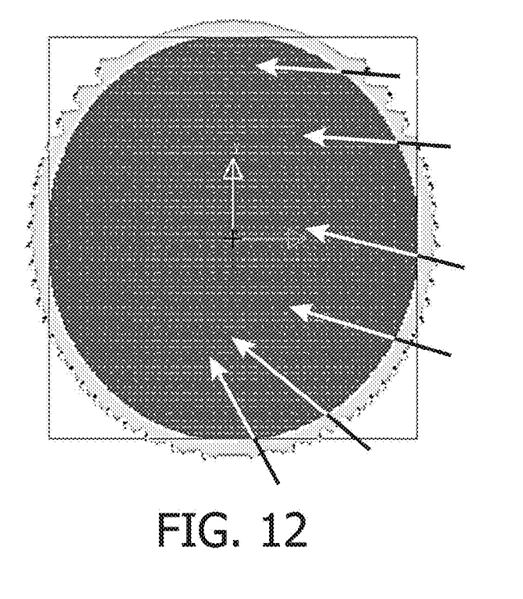
FIG. 12 shows how different LEDs are directed towards different directions.

FIG. 12 shows how different LEDs are directed towards different directions, i.e. not parallel and also not all directed to a common central point. The light guide shape corresponds to the desired contour of the reflector system.

The stepped contour allows a better uniformity of the luminance of the second major surface and helps a desired photometric distribution to be obtained, because the steering of collimated light is enhanced.

The design enables asymmetric light distributions to be obtained with uniform luminance on the exit window. The in-coupling reflectors provide control of the rays to homogenize the appearance of the light output window and also steers the light to follow desired directions to perform the required asymmetric distribution. This may for example be for illumination of a road from a street luminaire. In this case, a larger angle of divergence may be desired along the road direction than across the road direction, and also with illumination predominantly to one side (if the luminaire is at the edge of the road). Thus, the intensity distribution as projected from the luminaire to the ground may comprise a number of lobes of different intensity and reach.

Figure 13:
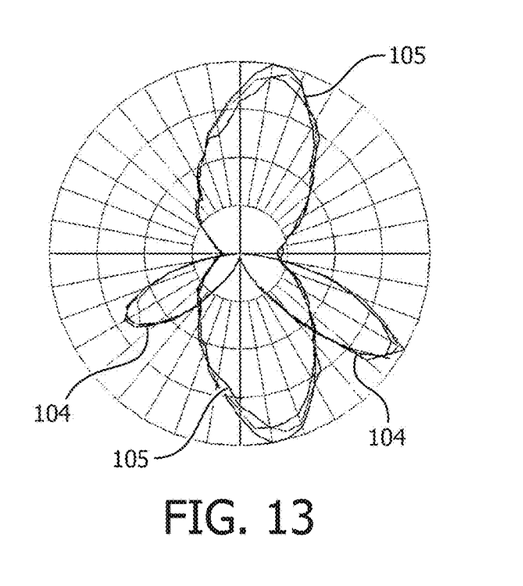
FIG. 13 shows an example intensity plot for the luminaire.

FIG. 13 shows an example intensity plot with respect to angle. It shows the typical photometry for a road lighting application. The asymmetrical pair of lobes 104 is for a cross section in a vertical plane and the symmetrical pair of lobes 105 is for a cross section in a horizontal plane.

Figure 14:
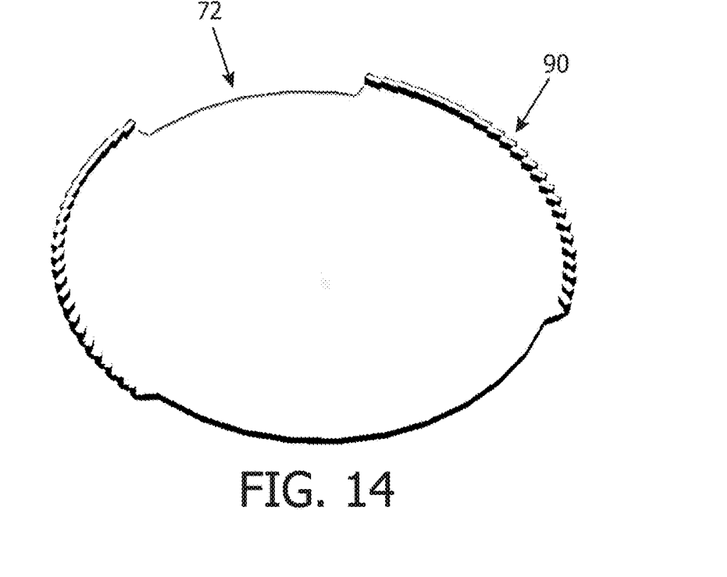
FIG. 14 shows how a light guide and array of lighting element reflectors may be formed as an integral unit.
Figure 15:
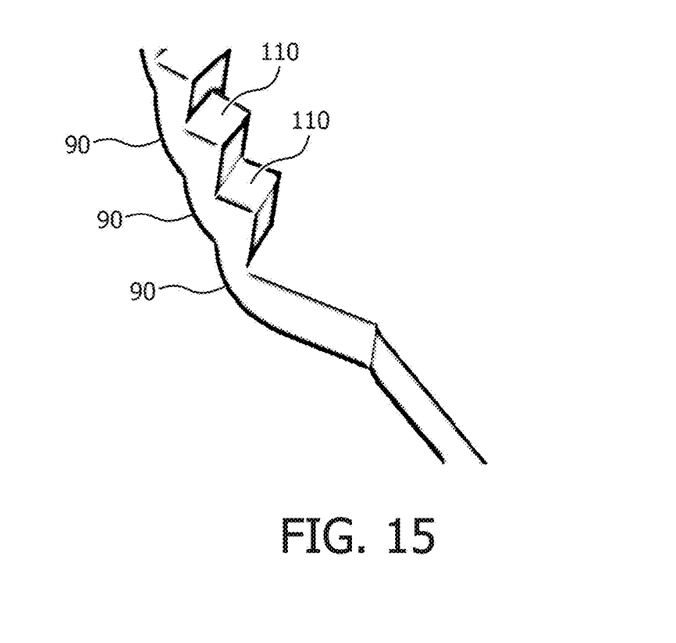
FIG. 15 shows a portion of FIG. 14 in more detail.

The light guide 72 and the array of lighting element reflectors 90 may be formed as an integral unit as shown in FIGS. 14 and 15. Each lighting element reflector 90 is formed as a curved lower surface of the light guide. Above the curved lower surface is a flat mounting surface 110 against which the LED is to be mounted by coupling the outer edge of the light guide with the LED PCB.

This design also has a stepped outer edge. The steps have a vertical portion and a horizontal mounting surface (when the luminaire is horizontal). The angular orientation of the step (about an axis parallel to the general light output direction) determines the direction in which light is directed into the light guide. The angular orientation is defined at least in part by the shape of the reflector 90 beneath the mounting surface 110.

For this design, it is preferred for the LEDs to have a flat exit surface which can be mounted against the mounting surface. This design reduces the number of optical parts and thus reduces alignment requirements. Of course, the manufacture of the shared component becomes more difficult requiring a more complex mold. Furthermore, the reflectors 90 may require a metallized surface if reflection by total internal reflection is not used.

The luminaire preferably comprises a controller arranged to individually control the solid state lighting elements as explained above for the example of FIGS. 1 and 2. This enables different output beams to be defined by a common physical design of luminaire.

The light guide may comprise a polymer material selected from polycarbonate, poly(methyl methacrylate) and polyethylene terephthalate.

The invention can be applied to any kind of luminaire where the appearance is important. It allows versatility on the form factor, which means the design can be circular, elliptical, square, rectangular, etc. and it enables symmetrical or asymmetrical beams to be defined. The invention can also be used for indoor luminaires in which a wide or very wide beam is required.

One example is for outdoor luminaires, such as road luminaires, but there are other examples of outdoor luminaire which may be of interest, such as parking garage luminaires. The same design may also be used in indoor luminaires.

The example above uses contoured light outcoupling elements (based on refraction) by printed white dots may instead be used to provide light scattering. The options discussed above in connection with FIGS. 1 and 2 apply.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A luminaire comprising:
   a light guide comprising an edge portion between a first major surface and a second major surface, wherein the first major surface defines light outcoupling elements and the second major surface is a flat light output surface which is visible in use of the luminaire, wherein a general light output direction is normal to the second major surface;
   an output reflector facing the first major surface;
   an array of solid state lighting elements arranged around the edge portion and each having an optical axis extending along and facing the general light output direction; and
   an array of lighting element reflectors, with a respective reflector associated with each solid state lighting element for reflecting light into the light guide.

2. A luminaire as claimed in claim 1, wherein the array of solid state lighting elements are provided on a flat printed circuit board having an annular or part-annular shape.

3. A luminaire as claimed in claim 2, wherein the flat printed circuit board has a C-shape, and wherein the solid state lighting elements are placed closer together away from the ends than at the ends.

4. A luminaire as claimed in claim 1, wherein the edge portion of the light guide has a stepped shape, with each solid state lighting element positioned at a step portion.

5. A luminaire as claimed in claim 1, wherein the light guide and the array of lighting element reflectors are formed as an integral unit.

6. A luminaire as claimed in claim 1, wherein the outer shape of the light guide is generally circular or elliptical.

7. The luminaire as claimed in claim 1, wherein the light outcoupling elements comprise 3-D optical elements or printed white dots.

8. A luminaire as claimed in claim 7, wherein the light outcoupling elements comprise prismatic elements.

9. A luminaire as claimed in claim 1, wherein the light guide, excluding the light outcoupling elements, has uniform thickness.

10. A luminaire as claimed in claim 1, wherein there is an array of more than 1000 light outcoupling elements.

11. A luminaire as claimed in claim 1, wherein the lighting element reflectors comprise reflectors having a surface in the shape of a Cartesian oval.

12. A luminaire as claimed in claim 1, wherein there is an array of more than 20 solid state lighting elements.

13. The luminaire as claimed in claim 1, further comprising a controller arranged to individually control the solid state lighting elements.

14. The luminaire as claimed in claim 1, wherein the light guide comprises a polymer material selected from polycarbonate, poly(methyl methacrylate) and polyethylene terephthalate.

15. The luminaire as claimed in claim 1, wherein the luminaire is an outdoor luminaire.

16. A luminaire as claimed in claim 2, wherein the flat printed circuit board is parallel to the second major axis.

\* \* \* \* \*